United States Patent
Kondou

(10) Patent No.: US 12,434,383 B2
(45) Date of Patent: Oct. 7, 2025

(54) 3D PRINTER USING ROBOT AND CONTROL APPARATUS FOR ROBOT

(71) Applicant: Fanuc Corporation, Yamanashi (JP)

(72) Inventor: Yuuki Kondou, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 172 days.

(21) Appl. No.: 18/037,875

(22) PCT Filed: Nov. 26, 2021

(86) PCT No.: PCT/JP2021/043480
§ 371 (c)(1),
(2) Date: May 19, 2023

(87) PCT Pub. No.: WO2022/118760
PCT Pub. Date: Jun. 9, 2022

(65) Prior Publication Data
US 2024/0009836 A1  Jan. 11, 2024

(30) Foreign Application Priority Data
Dec. 2, 2020 (JP) .................. 2020-200551

(51) Int. Cl.
*B33Y 30/00* (2015.01)
*B25J 9/16* (2006.01)
(Continued)

(52) U.S. Cl.
CPC ........... *B25J 9/1638* (2013.01); *B25J 13/085* (2013.01); *B29C 64/209* (2017.08);
(Continued)

(58) Field of Classification Search
None
See application file for complete search history.

(56) References Cited

U.S. PATENT DOCUMENTS

| 9,815,202 B2 | 11/2017 | Osaka et al. |
| 11,376,729 B2 | 7/2022 | Naitou et al. |

(Continued)

FOREIGN PATENT DOCUMENTS

| DE | 102010004496 B4 * | 6/2020 | ........... B05B 12/124 |
| EP | 2835249 B1 * | 3/2019 | ........... B25J 9/1679 |

(Continued)

OTHER PUBLICATIONS

English translation and drawings of DE-102010004496-B4 (wherein the paragraph numbering provided coincides with any relevant citations to this reference within the accompanying Office Action) (Year: 2020).*

(Continued)

*Primary Examiner* — Thomas E Worden
*Assistant Examiner* — Bryant Tang
(74) *Attorney, Agent, or Firm* — Buchanan Ingersoll & Rooney PC

(57) ABSTRACT

Provided are: a 3D printer using a robot and enabling molding of an article with high strength and high accuracy; and a control apparatus for said robot. A robot used as this 3D printer has: an input-side encoder that acquires information regarding the angle of an input axis of a joint of the robot operated on the basis of a control command; and an output-side encoder that acquires information regarding the angle of an output axis. A calculation unit of this control apparatus has: a control command storage unit having stored therein a control command for motors of respective axes of the robot; a deviation estimation unit that receives results of detection by both of the input-side encoder and the output-side encoder and estimates the deviation of an actual trajectory of the robot from the control command; and a control command correction unit that corrects the control command by using the estimation result by the deviation estimation unit.

6 Claims, 9 Drawing Sheets

(51) Int. Cl.
    *B25J 13/08*         (2006.01)
    *B29C 64/209*       (2017.01)
    *B29C 64/227*       (2017.01)
    *B29C 64/393*       (2017.01)
    *B33Y 50/02*        (2015.01)

(52) U.S. Cl.
    CPC .......... *B29C 64/227* (2017.08); *B29C 64/393* (2017.08); *B33Y 30/00* (2014.12); *B33Y 50/02* (2014.12)

(56) References Cited

U.S. PATENT DOCUMENTS

2020/0061866 A1\*   2/2020   Giles ..................... B28B 3/2645
2020/0198367 A1\*   6/2020   Zhang .................... B41J 3/4073

FOREIGN PATENT DOCUMENTS

| | | | |
|---|---|---|---|
| JP | 2016027951 A | 2/2016 | |
| JP | 2016218934 A | 12/2016 | |
| JP | 2017209762 A | 11/2017 | |
| JP | 2019098682 A | 6/2019 | |
| JP | 2019136711 A | \* | 8/2019 |
| JP | 2019537521 A | 12/2019 | |
| JP | 2020-104177 A | 7/2020 | |
| JP | 2020121355 A | 8/2020 | |
| JP | 2020189484 A | 11/2020 | |
| WO | 2018052469 A2 | 3/2018 | |

OTHER PUBLICATIONS

English translation of JP-2019136711-A (wherein the paragraph numbering provided coincides with any relevant citations to this reference within the accompanying Office Action) (Year: 2019).\*
International Search Report and Written Opinion for International Application No. PCT/JP2021/043480, dated Dec. 2021, 6 pages.

\* cited by examiner

3D PRINTER USING ROBOT AND CONTROL APPARATUS FOR ROBOT

CROSS REFERENCE TO RELATED APPLICATIONS

This is the U.S. National Phase application of PCT/JP2021/043480, filed Nov. 26, 2021, which claims priority to Japanese Patent Application No. 2020-200551, filed Dec. 2, 2020, the disclosures of each of these applications being incorporated herein by reference in their entireties for all purposes.

FIELD OF THE INVENTION

The present invention relates to a 3D printer using a robot, and a controller for the robot.

BACKGROUND OF THE INVENTION

A laminated modeling apparatus (so-called a 3D printer), configured to laminate materials such as resins and metals to model (print) a three-dimensional object, can easily model even complicated shapes compared to injection molding, etc. A typical 3D printer is a gate-type processing machine, but a 3D printer using an industrial robot is also well known (e.g., refer to Patent Literatures 1 and 2).

On the other hand, in an internal mechanism of a speed reducer of a robot, bending and/or deformation may occur due to lack of rigidity. Therefore, some well-known robots have an output-side encoder for detecting a rotation angle of an output shaft of a speed reducer, as well as an input-side encoder for detecting a rotation angle of a rotation shaft of a motor (e.g., refer to Patent Literatures 3 and 4).

PATENT LITERATURE

[PTL 1] JP 2019-537521 A
[PTL 2] JP 2019-098682 A
[PTL 3] JP 2016-027951 A
[PTL 4] JP 2020-121355 A

SUMMARY OF THE INVENTION

In a 3D printer using a gate-type processing machine, since the lamination direction of resin, etc. is limited, the strength and rigidity of a modeled object may be insufficient. On the other hand, in a 3D printer using a robot, the lamination direction can be changed arbitrarily, so that the strength and rigidity of the modeled object can be improved. However, in the 3D printer using the robot, the accuracy of the movement trajectory of the robot may be deteriorated due to the influence of a backlash in a speed reduction mechanism and/or a reaction force applied to the robot while injecting melted resin from a nozzle arranged at a front end of a robot arm, etc. As a means to prevent this deterioration in accuracy, simply providing an input-side encoder to the motor for driving each axis of the robot cannot accurately measure or estimate the influence of the backlash, etc. of the speed reducer, and thus it is difficult to appropriately correct the movement trajectory.

One aspect of the present disclosure is a robot controller for controlling an articulated robot having a nozzle configured to inject material of an object to be modelled, the robot controller comprising: a control command storage unit configured to store a control command including a planned print path to be followed by the nozzle when the nozzle moves while applying the material to the object; a deviation estimation unit configured to calculate a printed path corresponding to an actual motion trajectory of the nozzle based on angle information of each of input and output sides of a joint of the articulated robot operated based on the control command, and estimate a deviation between the printed path and the planned print path; and a control command correction unit configured to correct the control command so as to reduce or eliminate the estimated deviation.

Another aspect of the present disclosure is a 3D printer comprising: an articulated robot having a nozzle configured to inject and laminate material of an object to be modelled; and the robot controller according to the above one aspect configured to control the articulated robot.

According to the present disclosure, in a 3D printer using a robot, a unit for obtaining angle information is provided not only to an input axis side of the robot but also to an output axis side of the robot, and a motion trajectory of the robot is corrected by taking the influence of an application reaction force into consideration, whereby an object to be modelled can be formed with extremely high precision.

DETAILED DESCRIPTION OF EMBODIMENTS OF THE INVENTION

Figure 1:
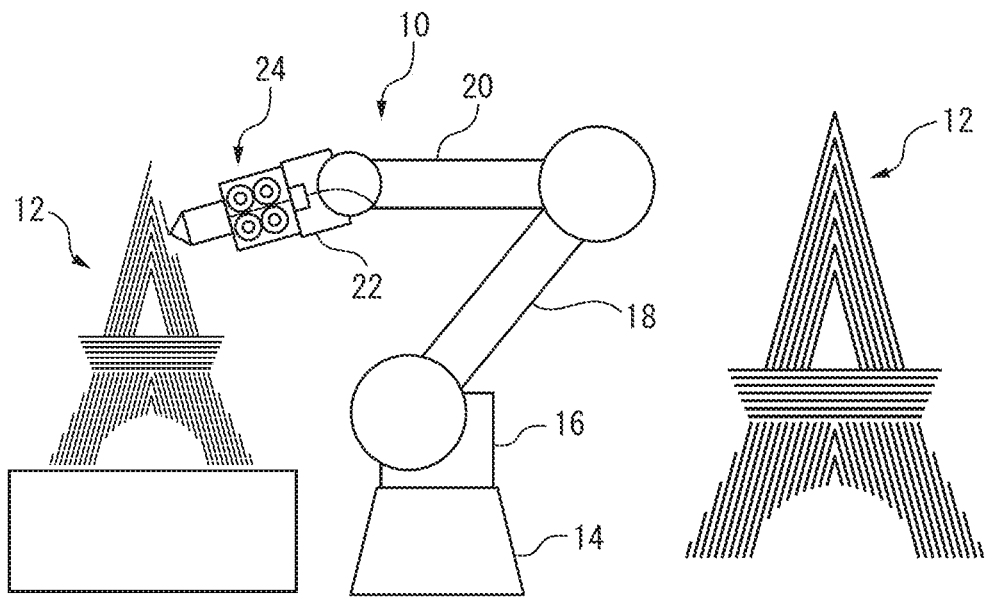
FIG. 1 is a schematic view of a robot used for a 3D printer according to one embodiment, and an object to be modelled.

FIG. 1 is a schematic view of a robot 10 used as a three-dimensional (3D) printer according to a preferred embodiment, and an object 12 to be modelled (printed, formed, shaped or built) by the 3D printer. The robot 10 is, for example, a six-axis vertical articulated robot for industrial use, and includes a base 14 installed on a floor surface, etc., a rotating body 16 connected to the base 14 so as to be rotatable about a substantially vertical axis, an upper arm 18 rotatably connected to the rotating body 16; a forearm 20 rotatably connected to the upper arm 18, a wrist 22 rotatably connected to the forearm 20, and an end effector 24 rotatably connected the wrist 22. In this embodiment, the end effector 24 is a nozzle unit configured to eject a resin filament, which is a material that forms the object 12 to be modelled, and applies it to the object 12.

Figure 2:
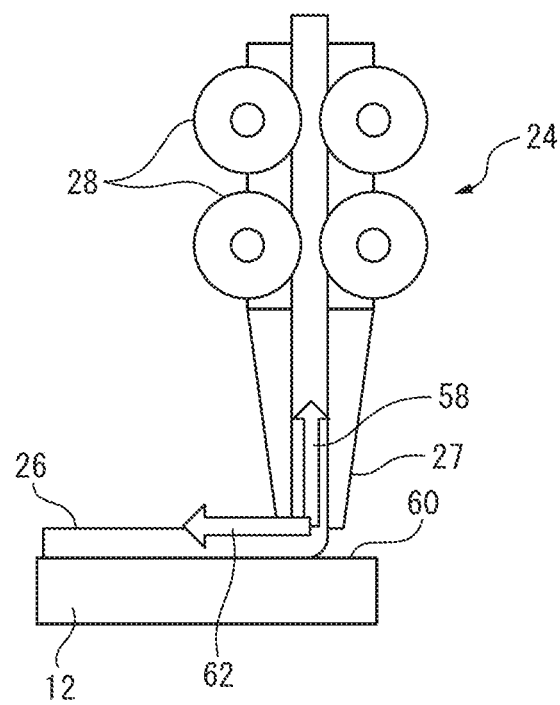
FIG. 2 is a schematic view of a nozzle unit attached to the robot of FIG. 1.

FIG. 2 shows a schematic configuration of the nozzle unit 24. The nozzle unit 24 includes a nozzle 27 configured to apply a filament 26, which is a melted thread-like resin material, to the object 12, a heater (not shown) configured to melt the filament 26, and a roller 28 configured to feed the filament 26. These components may be similar to well-known means. The temperature of the heater and an amount of rotation of the roller 28 can be controlled using at least a control command from a robot controller as described later. Data representing a correlation between the temperature of the heater and the amount of rotation of the roller, and a feeding amount of the filament can be previously obtained and stored, and the feeding amount of the filament can be controlled based on this data.

Figure 3:
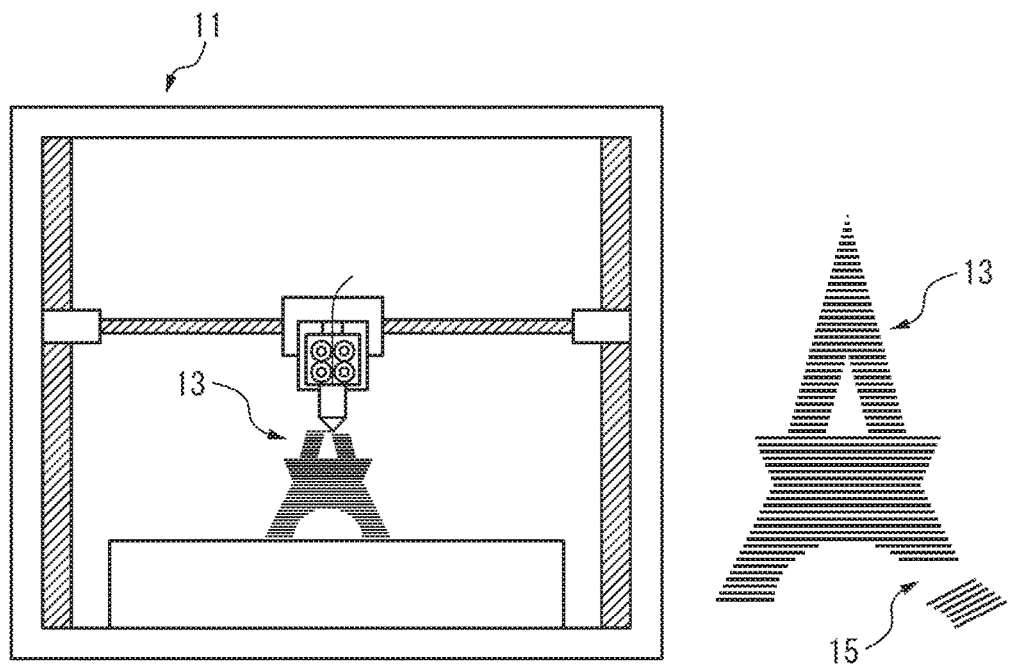
FIG. 3 is a schematic view of a gate-type 3D printer according to a comparative example.

FIG. 3 is a schematic view of a gate-type 3D printer 11 according to a comparative example, and an object to be modelled by the gate-type 3D printer 11, wherein the shape of object 13 is the same as the shape of the object 12. As shown, in the gate-type 3D printer 11, an application direction of the resin filaments is limited to the substantially horizontal direction over the entirety of the object 13, and the filaments are laminated in the substantially vertical direction. As such, when the application direction and the lamination direction are uniform, there is a problem that the strength of the modeled object against a force in a specific direction is weaker than that in other directions. For example, the modeled object is damaged at a portion where stress is likely to concentrate, such as a leg 15 of the object.

On the other hand, in the 3D printer using the articulated robot 10, the position and posture of the nozzle 27 can be arbitrarily changed and determined within the movable range of the robot 10, and the filament can be applied so as to follow an arbitrary trajectory. In general, the strength of the object to be modelled changes depending on the application direction of the filament. In this embodiment, the filament can be applied so as to follow the arbitrary trajectory, and thus it is possible to perform 3D printing in which the strength of the object is prioritized. For example, as shown in FIG. 1, in the object 12 to be modelled, the lamination direction of the resin can be changed for each part thereof, and it is possible to form/manufacture a product with higher strength than the object 13 as a whole. In particular, when the filament has anisotropy by mixing fibers into the resin filament, the trajectory can be determined so that the anisotropy works effectively, and the strength of the object can be increased.

As described above, the 3D printer using the robot 10 can form a high-strength modelled object, but it is also required to be able to apply the resin filament with at least the same accuracy as the gate-type 3D printer. Hereinafter, specific means for realizing this will be described.

Figure 4:
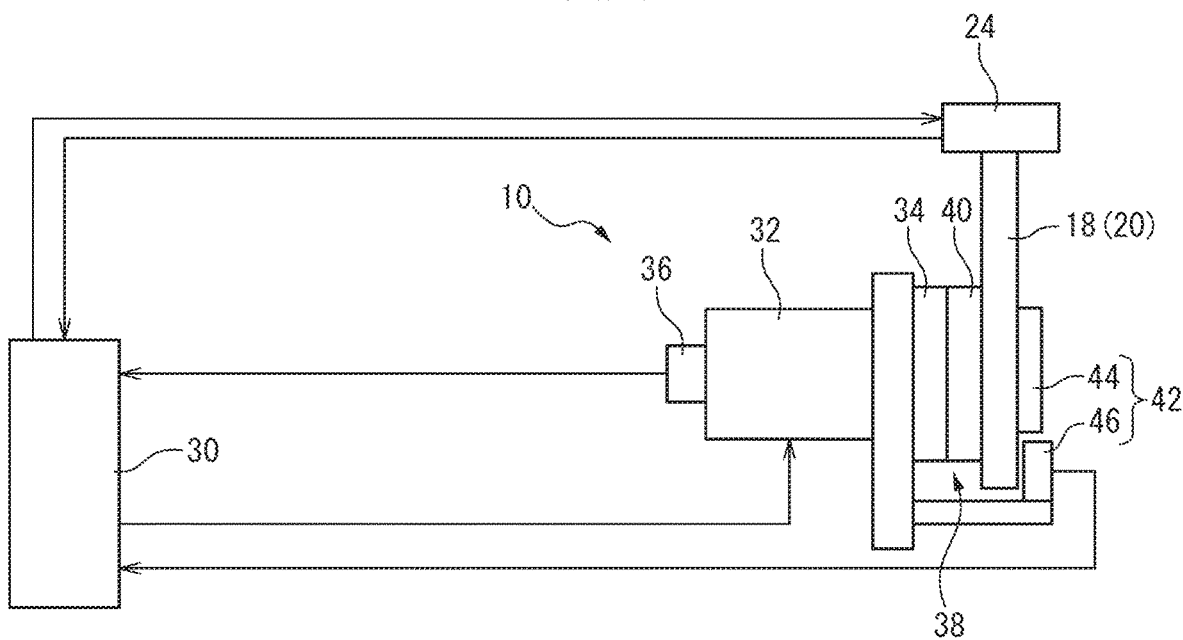
FIG. 4 is a view schematically showing a main part of the robot of FIG. 1.

FIG. 4 schematically shows a main part around each axis of the robot 10, with a controller 30 configured to control the robot 10. The robot 10 has an angle information acquisition unit configured to acquire angle information of each of an input axis and an output axis of a joint of the robot 10 which are operated based on a control command. Specifically, the robot 10 has an input-side encoder 36 configured to detect a rotation angle of a input shaft 34 driven by a motor 32, and an output-side encoder 42 configured to detect a rotation angle of an output shaft 40 connected to the input shaft 34 via a speed reducer 38, etc. The output-side encoder 42 in the illustrated example includes a disk- or ring-shaped scale member 44 configured to rotate integrally with the output shaft 40, and a sensor 46 configured to optically read a pattern arranged on the scale member 44 for angle detection. The input-side encoder 36 also may have the similar configuration as the output-side encoder 42.

By providing both the input-side encoder 36 and the output-side encoder 42 to one rotary shaft, even if the internal mechanism of the speed reducer 38 rattles, and/or bending or deforming due to lack of rigidity is generated, the positioning accuracy and trajectory accuracy of each joint axis of the robot 10 can be improved, by using both the rotation angle detected by the input-side encoder 36 and the rotation angle detected by the output-side encoder 42. Such configurations of the input-side encoder 36 and the output-side encoder 42 may be the same as those described in Patent Literature 4, for example, and therefore detailed description thereof will be omitted. As means for acquiring the angle information of the output shaft 40, in addition to the output side encoder 42, a camera (not shown) may be provided on the robot arm, and an image processor (not shown) configured to process the image of the camera may be used.

First Example

Figure 5:
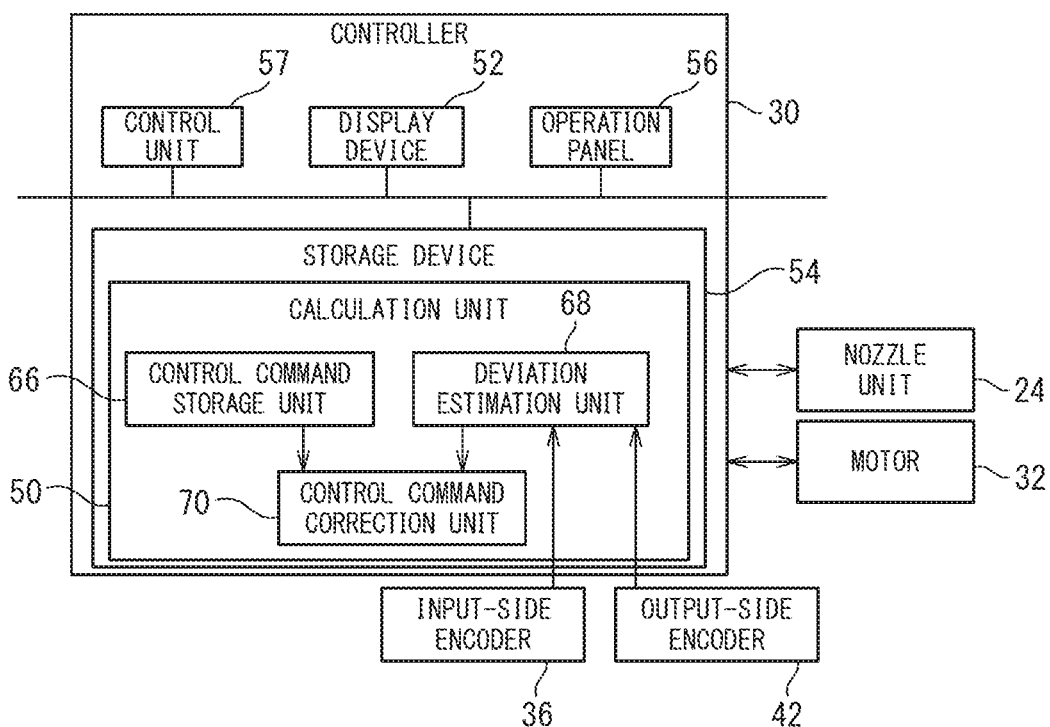
FIG. 5 is a functional block diagram of a robot controller according to a first example.

FIG. 5 is a functional block diagram of a first example of the robot controller 30. The controller includes, for example, a calculation unit 50 having a CPU and a RAM, etc., a display device 52 such as a liquid crystal display, and a storage device 54 having a non-volatile storage and a ROM, etc. The calculation unit 50 may be included in the storage device 54. A portable operation panel 56 capable of being carried by an operator is communicably connected to the controller 30 by wire or radio, so that contents input by the operator to the operation panel 56 are transmitted or input to the controller 30.

The controller 30 is connected to the motor 32 of each axis of the robot 10 and the nozzle unit 24, and controls them by a control unit 57 such as a CPU. The input-side encoder 36 and the output-side encoder 42 provided to each axis can detect the angle information of the input shaft 34 and the output shaft 40, respectively, and transmit the detected angle information to the controller 30. The nozzle unit 24 can detect the feeding amount of the filament, can transmit the detected feeding amount to the controller 30, and can receive a command regarding the feeding amount from the controller 30.

As shown in FIG. 2, when the robot 10 is used as a 3D printer, the nozzle 27 ejects and applies the viscous melted filament 26 while maintaining a state in which the nozzle 27 is in close proximity to an application surface 60, so the nozzle 27 is subject to an application reaction force. More specifically, a reaction force 58 along the axial direction of the nozzle 27 and a reaction force 62 along the application surface 60 of the application target 12 are applied to the nozzle 27. Due to these reaction forces and the effects of friction and/or backlash within the mechanism such as the speed reducer of the robot 10, a deviation may occur between the control command and the actual robot trajectory. Therefore, feedback using only the input-side encoder 36 has a relatively high possibility of causing an application deviation due to the deviation of the actual robot trajectory from the control command, such as a filament 26b relative to a filament 26a shown in FIG. 6. Further, it is difficult to execute appropriate feedback with the input-side encoder 36 only, after the application deviation such as the filament 26b occurs. Therefore, when a further filament is to be applied from the state of FIG. 6, an appropriate application reaction force cannot be obtained due to the contact between the nozzle 27 and the filament 26b, etc. As a result, as exemplified in FIG. 7, the filament such as a filament 26c may be deformed or lifted from the application surface 60, leading to so-called application defects.

Therefore, as shown in FIG. 5, the calculation unit 50 includes a control command storage unit 66 configured to store a previously designated or generated control command to the motor 32 of each axis of the robot 10, a deviation estimation unit 68 configured to receive detection results of both the input-side encoder 36 and the output-side encoder 42 and estimate the deviation between the control command and the actual trajectory of the robot 10, and a control command correction unit 70 configure to correct the control command by using the estimated result of the deviation estimation unit 68.

A basic operation of the robot 3D printer configured in this way will be described. The storage device 54 of the controller 30 stores 3D shape data of the object 12, a print path generation algorithm necessary for forming the object with the 3D printer according to the 3D shape data, a planned print path, a printed path, a path correction algorithm, and a planned print correction path. Hereinafter, each term will be explained.

Figure 8:
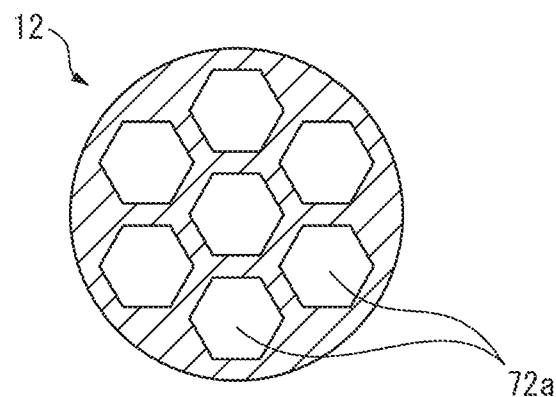
FIG. 8 is a view showing an example of sparse/dense of printing.
Figure 9:
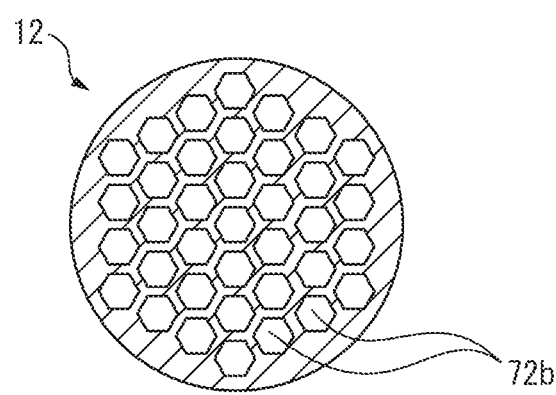
FIG. 9 is a view showing another example of sparse/dense of printing.
Figure 10:
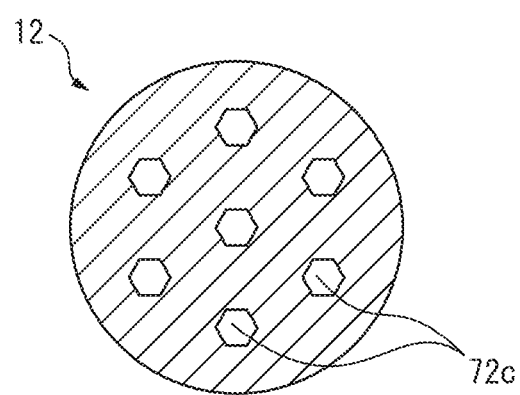
FIG. 10 is a view showing still another example of sparse/dense of printing.

The 3D shape data represents a final shape of the object to be modelled by the 3D printer, and includes information on the strength required for (each part of) the object, a printing direction (i.e., a direction of movement of the nozzle when injecting the filament to the object, and sparse/dense of printing, etc. As a specific example of the sparse/dense of printing, as shown in FIGS. 8 to 10, any one of hollow portions 72a to 72c having different cross-sectional areas may be formed inside the substantially cylindrical shaped object 12 to set the substantial density of the object 12 to a desired value. In the illustrated example, although the cross-sectional shape of each hollow portion is hexagonal, the shape is not limited as such, and thus the shape may have an arbitrary shape. Although such sparse/dense of printing can be realized by a conventional gate-type 3D printer, the filament can be stacked in any direction when using a robot, so it is possible to form a hollow portion with a more complicated and suitable shape.

The planned print path is a path to be followed when the nozzle 27 moves while applying the resin filament to the object 12, and is generated by reading the 3D shape data of the object 12 into a path generation algorithm, whereby the robot 10 starts and executes an operation based on the planned print path included in the control command. The path generation algorithm includes a mechanism interference analysis algorithm for the articulated robot, and generates a path as a trajectory along which the robot can move. However, the planned print path may not be completely dependent on a mechanical path generation algorithm, and may be finely adjusted by an operation by the operator, for example. Note that in this embodiment, path corrections are accumulated for each printing to improve accuracy, and one printing is also referred to as a print job.

The printed path is the actual movement trajectory of the nozzle 27 reproduced based on the detection results of the input-side encoder 36 and the output-side encoder 42, the feeding amount of the filament, and feedback from a force sensor as described below, etc. The printed path can also be referred to as a print history for each print job.

The planned print correction path is a path corrected by: using at least the above-described 3D shape data, the already executed planned print path and the corresponding printed path; smoothly connecting the executed planned print path and the corresponding printed path during printing; and adding three-dimensional deformation to the remaining (unexecuted) planned print path so as to match the final shape of the object to the shape represented by the 3D shape data. The planned print path, the printed path and the planned print correction path can be confirmed in a visually easy-to-understand state from an external user interface by using the display device 52 and the operation panel 56, etc.

The path correction algorithm is an algorithm for generating the planned print correction path. The degree of faithful reproduction of the original planned print path, the timing of reflecting the correction, and the timing of updating can be designated separately.

Next, a specific example of processing in the controller 30 of FIG. 5 according to the first embodiment will be described. First, in the control command storage unit 66 of the calculation unit control commands based on the above-described planned print path are stored. When starting printing of the object 12, the control command is transmitted to the motor 32 for each axis of the robot 10 and the nozzle unit 24 so that the nozzle 27 injects the resin filament 26 while moving along the planned print path of the object 12. The robot 10 applies the resin filament 26a to the object 12 according to the transmitted control command, as exemplified in FIG. 6.

Here, the calculation unit 50 generates the printed path based on the detection results of the input-side encoder 36 and the output-side encoder 42. Next, the deviation estimation unit 68 calculates and estimates the deviation between the control command and the actual motion trajectory of the robot, based on the difference between the planned print path and the printed path. Then, the control command correction unit 70 corrects the control command in order to reduce or eliminate the estimated deviation. For example, in the example of FIG. 6, each time one straight filament is applied or each time each segment of one filament divided by a predetermined length is applied, the printed path is generated. Then, by correcting the control command based on the deviation between the printed path and the planned print path, it can be detected that the filament 26b significantly deviates from the planned print path, and the application path of the filament 26b can be corrected so as to reduce or eliminate the deviation of the filament 26*b*. Therefore, it is possible to greatly reduce the possibility of occurrence of a problem which causes a larger deviation, as the filament 26*c* in FIG. 7. For the printed path in the first example, it is sufficient to obtain information of the filament or segment immediately adjacent to the filament or segment to be applied.

Figure 6:
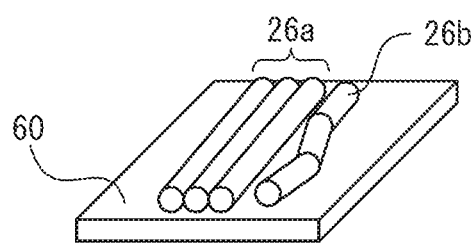
FIG. 6 is a schematic view showing a state in which a resin filament is applied to the object to be modelled.
Figure 7:
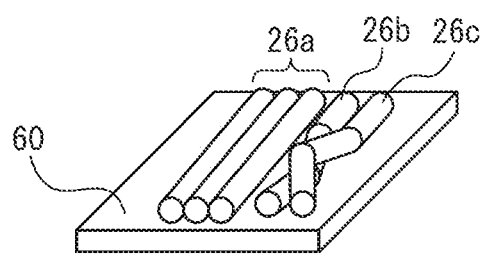
FIG. 7 is a schematic view showing a state as a comparative example, in which a resin filament is further applied in the state of FIG. 6.

In the first example, by reading the information from the output-side encoder 42 before printing is started, and by correcting the control command using the read information, the movement trajectory (of the nozzle 27) of the robot 10 is made highly accurate. In other words, the output-side encoder 42 can accurately detect an error in the trajectory of the nozzle, including the influence of the application reaction force which is a phenomenon peculiar to the 3D printer, whereby the problems peculiar to the 3D printer can be solved and extremely high-precision 3D printing can be performed. For example, the probability of occurrence of an application misalignment such as the filament 26*b* in FIG. 6 is greatly reduced, and even if the application misalignment like the filament 26*b* occurs, the probability of further increasing the application misalignment like the filament 26*c* in FIG. 7 is greatly reduced.

Second Example

Figure 11:
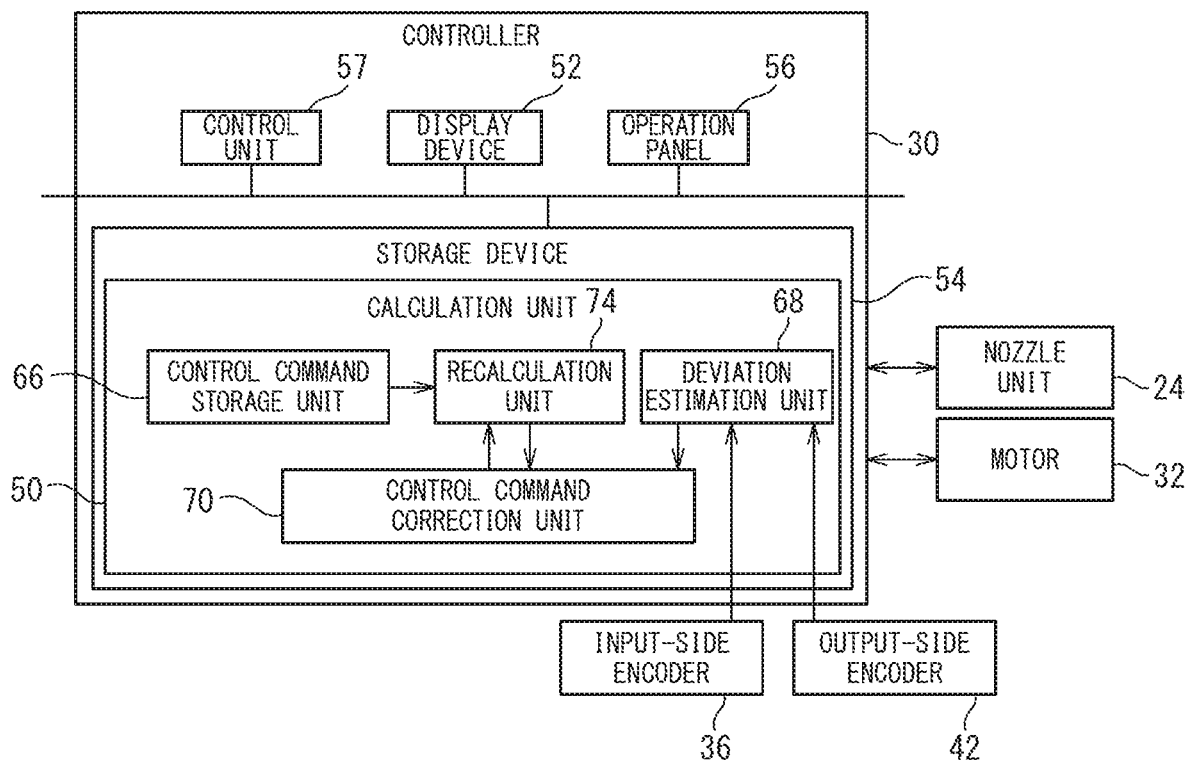
FIG. 11 is a functional block diagram of a robot controller according to a second example.

FIG. 11 is a functional block diagram of a second example of the robot controller 30. In the second example, only the matters different from the first example will be described, and descriptions of the matters which may be the same as the first example will be omitted.

The calculation unit 50 further includes a recalculation unit 74 configured to accumulate the history of the deviation correction and recalculate the trajectory to be followed by the nozzle 27, in addition to the control command storage unit 66, the deviation estimation unit 68 and the control command correction unit 70. The control command correction unit 70 changes the correction amount of deviation based on the recalculated trajectory. In other words, after the application deviation occurs in the width direction of the application, one or more planned print correction paths are generated by the recalculation unit 74 so that the actual trajectory asymptotically coincides with the target trajectory, and the control command correction unit 70 corrects the control command in a stepwise manner based on the planned print correction path. For example, after the application deviation such as the filament 26*b* in FIG. 6 occurs, an application is performed to stepwise reduce the application deviation as shown by a filament 26*d*, and finally, as shown by a filament 26*e*, an application identical to the target trajectory is performed. Preferably, the printed path in the second example includes all of the past print histories.

Figure 12:
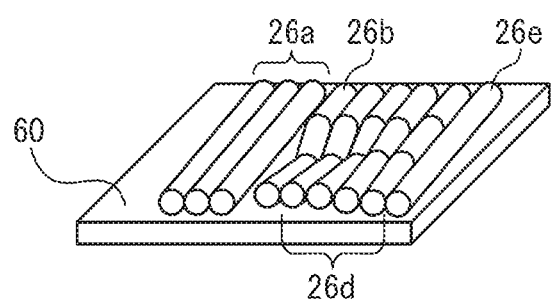
FIG. 12 is a schematic view showing a state in the second example, in which a resin filament is further applied in the state of FIG. 6.
Figure 13:
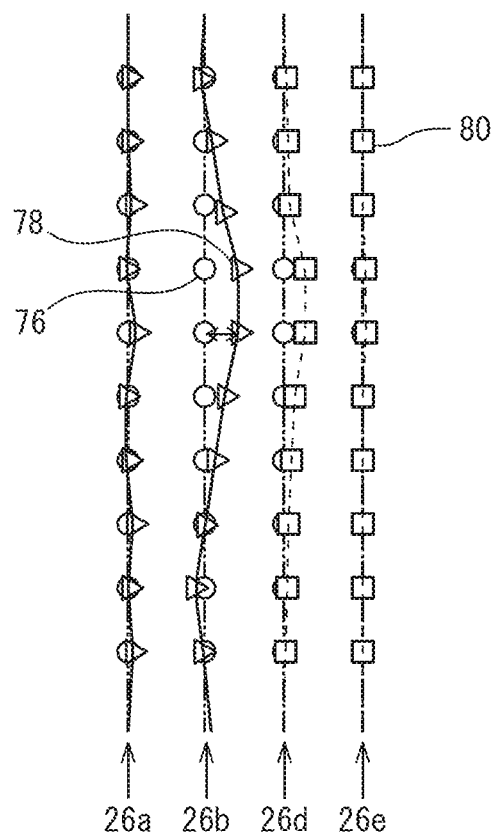
FIG. 13 is a view explaining an example of a process for correcting a trajectory of the robot in a stepwise manner.

FIG. 13 illustrates a specific example of the process for realizing the application shown in FIG. 12. Here, the path along which the filament is applied is represented by point group data, and for the filament 26*a*, the planned print path indicated by circle marks 76 and the printed path indicated by triangular marks 78 generally match to each other. However, it is assumed that, as shown by the filament 26*b*, the printed path 78 deviates from the planned print path 76 due to factors such as variations in the application reaction force.

For the filament 26*d* to be applied next, instead of correcting the path by the amount corresponding to the deviation generated at the filament 26*b*, corrections are performed a plurality of times (four times in the example of FIG. 12) by an amount smaller than the above deviation, as in the planned print correction path represented by square marks 80, and finally, as indicated by a filament 26*e*, a planned print correction path 80 substantially coinciding with the planned print path 76 is obtained. As a result, it is possible to smoothly correct the deviation and obtain the modelled object having the desired shape. Various methods can be used for such matching the coordinates of the point groups. For example, a method of calculating a simple average with the surroundings, or a method of using a numerical analytical thermal equilibrium model, etc., may be used.

In the second example, after detecting and estimating the deviation between the planned print path and the printed path similarly to the first embodiment, a path correction algorithm is executed. Then, based on the 3D shape data and the estimated deviation, the above-described planned print correction path is generated with a predetermined correction strength, and the 3D print path (control command) is updated at the specified timing.

In this regard, the correction strength is previously set or modified by the operator, and refers to how often the deviation of the trajectory is corrected when generating the planned print correction path, how many steps are taken to asymptotically approach the planned print path, and how far from the correction target trajectory the information of the other trajectories is to be used to correct the deviation, etc. Note that the generation of the planned print correction path and the actual 3D printing may proceed at the same time. However, when a wide range of deviation is reflected in the correction in the setting of the correction strength described above, the generation of the planned print correction path may be delayed until all printed paths in this range are generated.

As described above, in the second example, the planned print correction path is generated in which the deviation between the planned print path and the printed path is reduced in the stepwise manner with respect to filament application in the width direction (or the direction parallel to the application surface) of the application. Then, using the planned print correction path and the deviation between the planned print correction path and the printed path, the control command is corrected so as to achieve the target application state asymptotically, so that the application deviation can be smoothly eliminated and the desired appearance of the modelled object can be obtained.

Third Example

Figure 14:
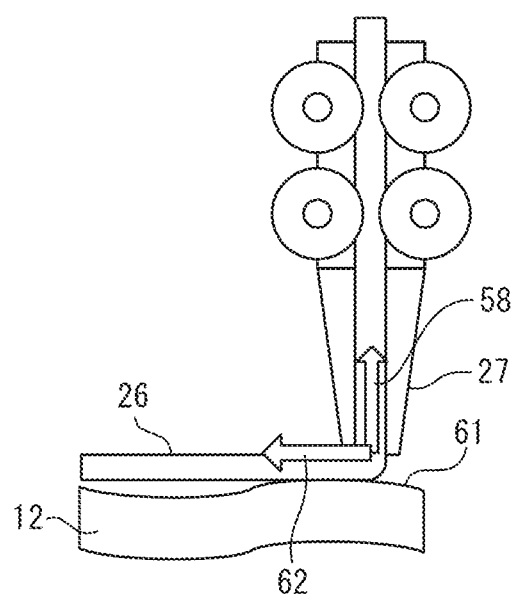
FIG. 14 is a schematic view of a state as a comparative example, in which a resin filament is applied to an uneven application surface.

FIG. 14 shows, as a comparative example, an example of an application state when an appropriate reaction force is not obtained during filament application. Here, an application surface 61 of the object 12 to be modelled is not flat but has unevenness. As described with reference to FIG. 2, the application reaction forces 58 and 62 are applied to the nozzle 27 when the filament 26 is being applied. In particular when the application surface 61 *ha* unevenness, the application reaction force may considerably fluctuate. When the application reaction force is larger than an assumed value, a problem such as crushing of the filament 26 may occur. To the contrary, when the reaction force is smaller than the assumed value, a problem such as the filament 26 not fitting into the application surface 61 and peeling off from the application surface 61 as shown in FIG. 14 may occur. In addition to the unevenness of the application surface, the application reaction force may fluctuate depending on the temperature and humidity of the application surface or surroundings, fluctuation in the trajectory of the robot, nozzle conditions, etc., and the fluctuation of the reaction force adversely affect print quality.

Figure 15:
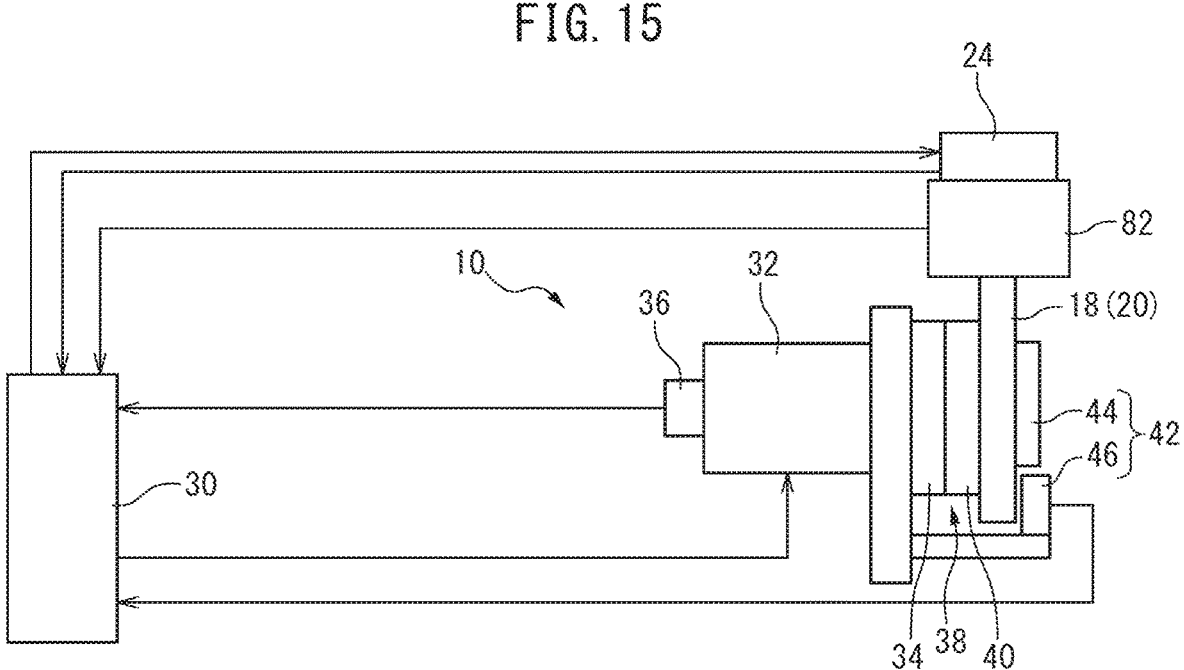
FIG. 15 is a view schematically showing the main part of the robot of FIG. 1, to which a force sensor is added.

Therefore, as shown in FIG. 15, in the third example, a force sensor 82 configured to measure the reaction force applied to the nozzle 27 is arranged inside or near the nozzle unit 24. As a specific example of the force sensor 82, a six-axis force sensor capable of detecting forces in three orthogonal directions and torques in three rotational directions may be used. By using the force sensor 82 as described above, the magnitude and direction of a resultant force of the reaction forces 58 and 62 can be detected, and the respective magnitude of the reaction forces 58 and 62 can be determined by a simple calculation using the resultant force. However, the means for estimating the application reaction force is not limited to the six-axis force sensor. For example, a method of providing a slider and a spring at the front end of the nozzle unit 24 and determining the force from the pushing amount of the slider and the spring constant may be used. Alternatively, a method of determining the distance between the application surface and the nozzle by using a capacitance sensor or a laser displacement meter and determining the force from the physical properties of the filament may also be used. These methods may also be implemented as accessory functions inside the nozzle unit.

Figure 16:
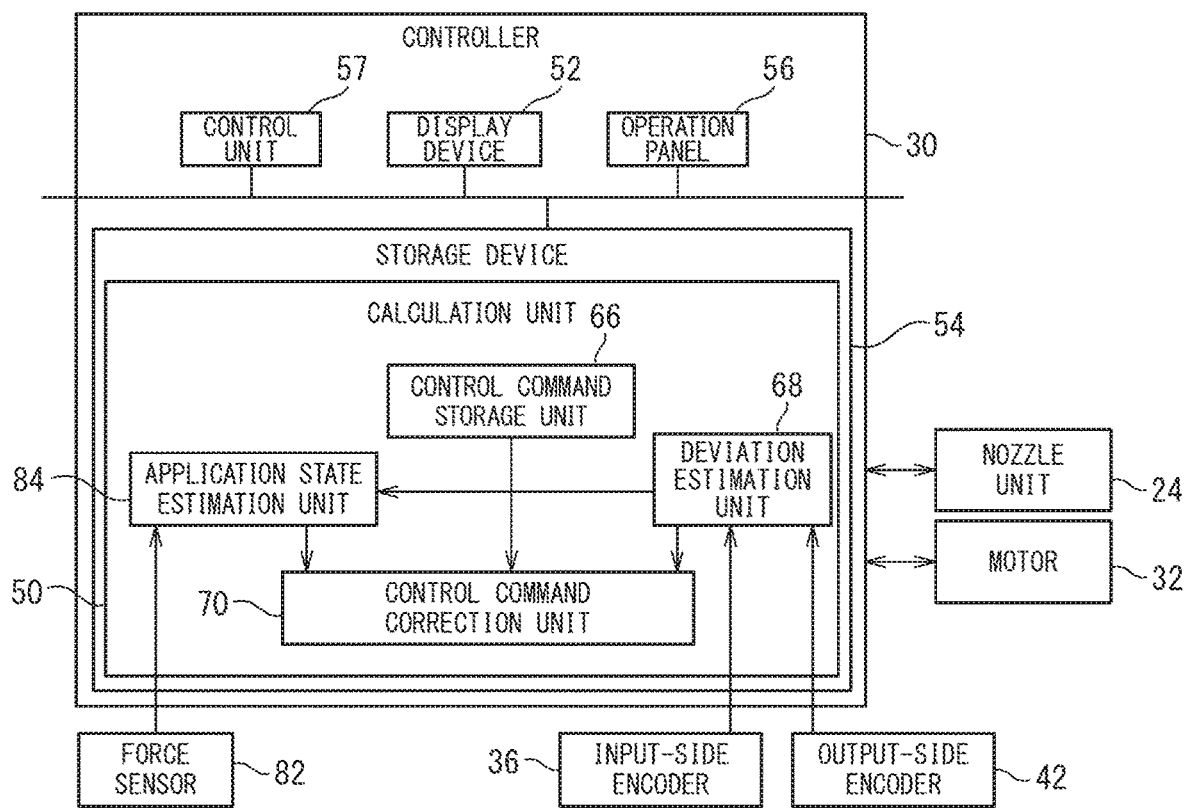
FIG. 16 is a functional block diagram of a robot controller according to a third example.

As shown in FIG. 16, the calculation unit 50 of the robot controller 30 includes, in addition to the control command storage unit 66, the deviation estimation unit 68 and the control command correction unit 70, an application state estimation unit 84 configured to use the detection result of the force sensor 82 during injecting the resin filament, and estimate an application state of the filament having a strong correlation with the application reaction force. The control command correction unit 70 corrects the control command by using the estimated application state in addition to the estimation result of the deviation estimation unit 68.

Figure 17:
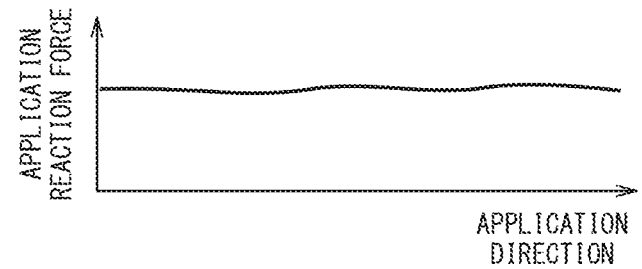
FIG. 17 is a graph showing an example of a relationship between an application direction and an application reaction force.

Concretely, as exemplified in FIG. 17, the relationship between the application direction and an ideal application reaction force is previously stored as target data in the storage device 54 of the controller 30, etc. The ideal reaction force is for obtaining a good application state without crushing or peeling of the filament, and varies depending on the material and a wire diameter of the filament, a printing speed, printing quality, and the application direction, etc. These information may also be previously stored in storage device 54, etc. Also, the relationship between the application reaction force, the feeding amount of the filament, and the deformation mode during the filament application can be previously obtained and stored as data.

Figure 18:
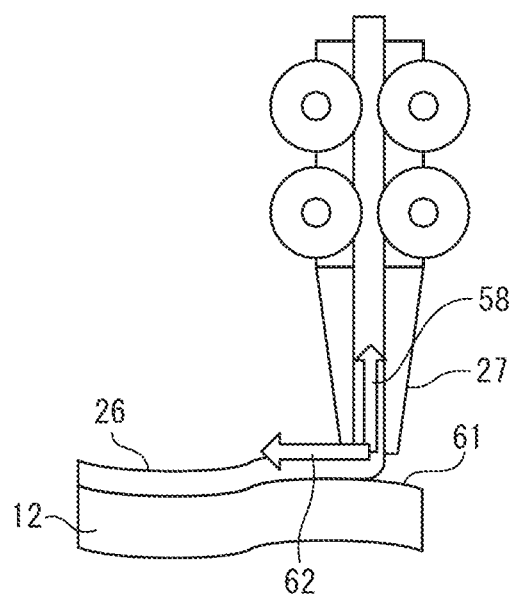
FIG. 18 is a schematic view of a state in the third example, in which a resin filament is applied to an uneven application surface.
}

Then, feedback control can be performed so that the actual application reaction force detected by the force sensor 82 is within a predetermined target range by which a good application state can be realized. In this way, the force sensor 82 is arranged between the robot arm 18 or 20 and the nozzle unit 24, and the application reaction force can be obtained by the controller 30. By virtue of this, by using the history of the application reaction force, it is possible to press the nozzle 27 against the application surface 61 so as to obtain the designated target application reaction force, and printing which fits the curvature and/or the unevenness of the application surface 61 can be performed, as exemplified in FIG. 18.

Fourth Example

Hereinafter, a fourth example of the robot controller 30 will be explained. The fourth example generally corresponds to a combination of the second and third examples. In the fourth example, only the matters different from the second and third examples will be described, and descriptions of the matters which may be the same as the second and third examples will be omitted.

Figure 19:
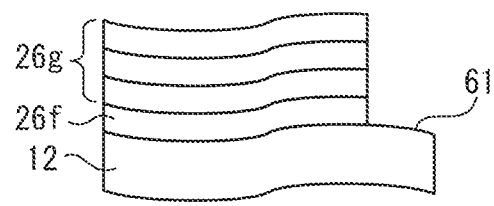
FIG. 19 is a schematic view of a state in the third example, in which a resin filament is laminated on an application surface.

In the third example, even when the application surface 61 has unintended unevenness, the filament application fitting the unevenness can be performed. However, when such application is repeated in the thickness direction (or the direction generally perpendicular to the application surface 61), the outer shape of the final modelled object may also reflect the unevenness of the application surface 61, as shown in FIG. 19. Specifically, a filament 26f which fits the unevenness of the application surface 61 is applied onto the application surface 61, and filaments 26g having the same shape as the filament 26f are laminated on the filament 26f.

Figure 20:
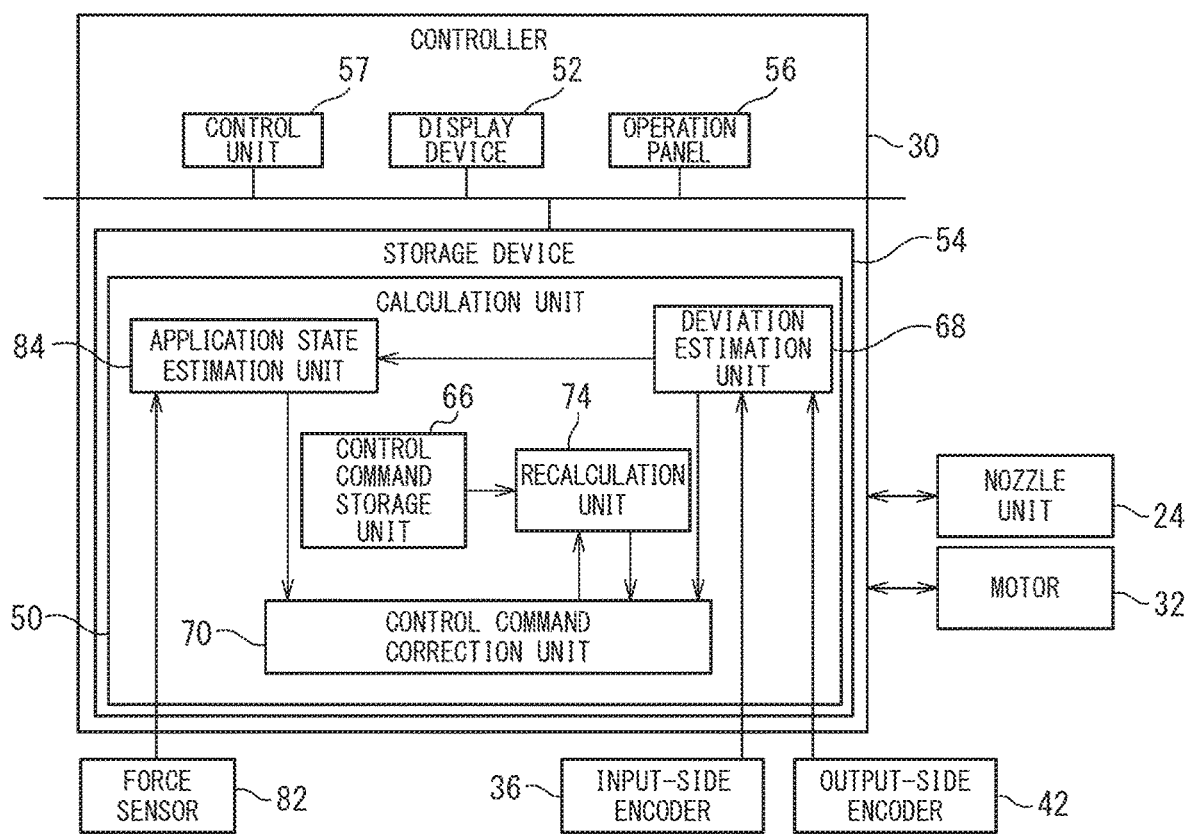
FIG. 20 is a functional block diagram of a robot controller according to a fourth example.
Figure 21:
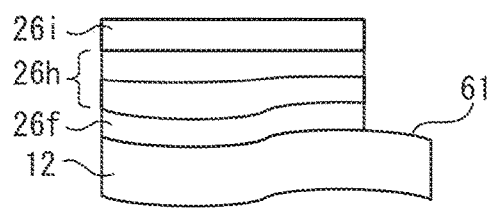
FIG. 21 is a schematic view of a state in the fourth example, in which a resin filament is laminated on an application surface.

Therefore, as shown in FIG. 20, the calculation unit 50 of the robot controller 30 includes, in addition to the control command storage unit 66, the deviation estimation unit 68, the control command correction unit 70 and the application state estimation unit 84, a recalculation unit 74 configured to accumulate corrections of deviation and recalculate the trajectory. Similarly to the second embodiment, the control command correction unit 70 changes the correction of deviation based on the recalculated trajectory. In other words, after the application deviation occurs in the thickness direction of the application, the control command is corrected in a stepwise manner so that the actual trajectory asymptotically coincides with the target trajectory. For example, like the filament 26f in FIG. 19, after the filament which fits the unevenness of the application surface is applied, the application is performed to stepwise reduce the unevenness as shown by filaments 26h, and finally, as shown in FIG. 21, the application is performed in conformity with the target trajectory, such as a filament 26i.

In the fourth example, similarly to the second example described with reference to FIG. 13, the planned print correction path 80 is generated based on the planned print path 76 included in the designated control command. However, it is also possible to generate a new planned print path based on the previously generated printed path. For example, it is assumed that there is an unintended large recess on the application surface 61, the divergence between the printed path and the original planned printing path is large, and appropriate application may be difficult with asymptotic correction. In such a case, based on the difference in shape between the printed path and the object to be modelled, a new planned print path including a path which fills only the recess may be generated. Such processing can also be performed in the second embodiment including the recalculation unit 74.

The above function of each unit of the controller 30 may also be provided by a computer program. For example, the storage device 54 stores various data used in each process executed by the calculation unit 50, and various data generated during each process. Each component of the calculation unit 50 (such as the control command correction unit 70) may be a functional module realized by the computer program executed by the processor. Moreover, such a computer program may be provided in a form recorded in a computer-readable non-transitory recording medium such as a semiconductor memory, a magnetic recording medium or an optical recording medium.

REFERENCE SIGNS LIST

10 robot
12 object to be modelled 24 nozzle unit
26 filament
27 nozzle
30 robot controller
32 motor
36 input-side encoder
42 output-side encoder
50 calculation unit
52 display device
54 storage device
56 operation panel
57 control unit
58, 62 application reaction force
66 control command storage unit
68 deviation estimation unit
70 control command correction unit
74 recalculation unit
82 force sensor
84 application state estimation unit

The invention claimed is:

1. A robot controller configured to control an articulated robot having a nozzle configured to inject material of an object to be modelled, the robot controller comprising:
   a control command storage unit configured to store a control command including a planned print path to be followed by the nozzle when the nozzle moves while applying the material to the object;
   a deviation estimation unit configured to calculate a printed path corresponding to an actual motion trajectory of the nozzle based on angle information of each of input and output sides of a joint of the articulated robot operated based on the control command, and estimate a deviation between the printed path and the planned print path;
   a control command correction unit configured to correct the control command so as to eliminate the estimated deviation; and
   an application state estimation unit configured to estimate an application state of the object to be modelled based on a reaction force applied to the nozzle while the material is injected,
   wherein the control command correction unit corrects the control command so that the reaction force is within a target range predetermined based on the application state.

2. The robot controller according to claim 1, further comprising a recalculation unit configured to generate a plurality of planned print correction paths by which the deviation between the planned print path and the printed path is reduced in a stepwise manner,
   wherein the control command correction unit stepwise corrects the control command based on the planned print correction path so that the printed path asymptotically approaches the planned print path in a thickness direction of the application of the material.

3. A 3D printer comprising:
   an articulated robot having a nozzle configured to inject and laminate material of an object to be modelled; and
   a robot controller configured to control an articulated robot having a nozzle configured to inject material of an object to be modelled, the robot controller comprising:
   a control command storage unit configured to store a control command including a planned print path to be followed by the nozzle when the nozzle moves while applying the material to the object;
   a deviation estimation unit configured to calculate a printed path corresponding to an actual motion trajectory of the nozzle based on angle information of each of input and output sides of a joint of the articulated robot operated based on the control command, and estimate a deviation between the printed path and the planned print path; and
   a control command correction unit configured to correct the control command so as to reduce or eliminate the estimated deviation,
   wherein the articulated robot has an input-side encoder configured to obtain angle information of the input side of the joint, and an output-side encoder configured to obtain angle information of the output side of the joint.

4. A 3D printer comprising:
   an articulated robot having a nozzle configured to inject and laminate material of an object to be modelled; and
   a robot controller configured to control an articulated robot having a nozzle configured to inject material of an object to be modelled, the robot controller comprising:
   a control command storage unit configured to store a control command including a planned print path to be followed by the nozzle when the nozzle moves while applying the material to the object;
   a deviation estimation unit configured to calculate a printed path corresponding to an actual motion trajectory of the nozzle based on angle information of each of input and output sides of a joint of the articulated robot operated based on the control command, and estimate a deviation between the printed path and the planned print path; and
   a control command correction unit configured to correct the control command so as to reduce or eliminate the estimated deviation,
   wherein the articulated robot has a force sensor configured to detect a reaction force applied to the nozzle.

5. The 3D printer according to claim 3, wherein the robot controller further comprises a recalculation unit configured to generate a planned print correction path so that the deviation between the planned print path and the printed path is reduced in a stepwise manner and the printed path asymptotically approaches the planned print path in a width direction of the application,
   wherein the control command correction unit corrects the control command based on the planned print correction path generated by the recalculation unit and the deviation between the planned print correction path and the printed path.

6. The 3D printer according to claim 5, wherein the recalculation unit generates a new planned print path based on a previously generated printed path and a shape of the object to be modelled.

* * * * *